3,218,333
ARYL INDOLYL ALKENYL AMINES
Robert Cornelis Roozemond, Haarlem, North Holland,
Netherlands, assignor to N.V. Koninklijke Pharmaceutische Fabrieken v/h Brocade Stheeman en Pharmacia,
Amsterdam, Netherlands, a Dutch corporation
No Drawing. Filed Sept. 10, 1963, Ser. No. 307,801
Claims priority, application Great Britain, Oct. 19, 1962,
39,757/62
10 Claims. (Cl. 260—319)

This invention relates to new chemical compounds having the valuable therapeutic properties and processes and intermediates for the preparation thereof.

The therapeutically active compounds of this invention are bases of the general formula I:

(I)

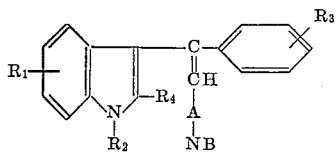

and the acid-addition salts thereof, wherein $R_1$ is hydrogen, halogen, or lower alkoxy; $R_2$ is hydrogen, lower alkyl, monocyclic aryl (lower alkyl) or lower alkanoyl; $R_3$ is hydrogen, halogen, trifluoromethyl, lower alkyl or lower alkoxy; $R_4$ is hydrogen or lower alkyl; A is lower alkylene; and NB is a basic nitrogen-containing radical of less than twelve carbon atoms. Among the suitable radicals represented by the symbol NB are: amino; (lower alkyl)amino; di(lower alkyl)amino; (hydroxy-lower alkyl)amino; di(hydroxy-lower alkyl)amino; phenyl-(lower alkyl)amino; N-(lower alkyl)-N-phenyl(lower alkyl)amino; and saturated 5 to 7 membered monocyclic N-heterocyclic radicals of less than twelve carbon atoms, as exemplified by piperidino; (lower alkyl)-piperidino; (lower alkoxy)-piperidino; homopiperidino; pyrrolidino; (lower alkyl)-pyrrolidino; di(lower alkyl)pyrrolidino; (lower alkoxy)-pyrrolidino; morpholino; (lower alkyl) morpholino; di(lower alkyl)morpholino; (lower alkoxy) morpholino; thiamorpholino; (lower alkyl)thiamorpholino; di(lower alkyl)thiamorpholino; (lower alkoxy) thiamorpholino; piperazino; (lower alkyl)-piperazino (e.g., $N^4$-methylpiperazino); di(lower alkyl)-piperazino; (lower alkoxy)piperazino; $N^4$-(hydroxy-lower alkyl)piperazino; $N^4$-(lower alkanoyloxy-lower alkyl)-piperazino; and homopiperazino. The terms "lower alkyl," "lower alkoxy" and "lower alkylene" as employed herein, include both straight and branched chain radicals of less than eight carbon atoms. The particularly preferred compounds are those wherein $R_1$ is hydrogen, halogen or lower alkoxy; $R_2$ is hydrogen, methyl or acetyl; $R_3$ is hydrogen or lower alkyl; $R_4$ is hydrogen; A is ethylene, propylene or isopropylene; and NB is mono(lower alkyl)amino or di(lower alkyl)amino.

As to the salts, those coming within the purview of this invention include the acid-addition salts, particularly the non-toxic acid-addition salts. Acids useful for preparing these acid-addition salts include, inter alia, inorganic acids, such as the hydrohalic acids (e.g., hydrochloric and hydrobromic acid), sulfuric acid, nitric acid, boric acid and phosphoric acid, and organic acids, such as oxalic, fumaric, tartaric, citric, acetic, succinic, pamoic and maleic acid.

The compounds of this invention and the acid-addition salts thereof are therapeutically active compounds which possess sedative and local anesthetic activities. Thus, the compounds of this invention can be administered as sedatives perorally, the dosage for such treatment being adjusted for the activity of the particular compound employed.

The compounds of this invention can be prepared by the process of this invention which comprises treating a compound of the general Formula II:

(II)

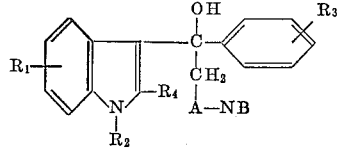

wherein $R_1$, $R_2$, $R_3$, $R_4$, A, and NB are as hereinbefore defined, with a dehydrating agent. The dehydration may be effected with dehydrating agents such as acid anhydrides, particularly lower alkanoic anhydrides, e.g., acetic anhydride, or esters of polyphosphoric acid. When $R_2$ in Compounds II is hydrogen, concomitant acylation of the nitrogen atom of the indole nucleus occurs when an acid anhydride, such as a lower alkanoic anhydride, is employed as the dehydrating agent.

The compounds of Formula II are prepared as described in my application, Serial No. 307,802, now abandoned, filed on even date herewith.

Acid-addition salts of the bases of Formula I can be prepared in the conventional manner, by treating the base with an equivalent quantity of the desired acid in an inert solvent.

The following examples illustrate the invention (all temperatures being in centigrade):

EXAMPLE 1

4-dimethylamino-1-(1-acetylindol-3-yl)-1-phenylbut-1-ene oxalate 4.6 g. of 4-dimethylamino-1-(indol-3-yl)-1-phenyl-butan-1-ol is dissolved in 45 ml. of acetic anhydride. The solution is boiled under reflux for two hours. The acetic anhydride is distilled off under reduced pressure. The residue is cooled in an ice bath, and then a saturated potassium carbonate solution is added. The mixture is extracted with ether. After filtration, the ethereal solution is washed with a potassium carbonate solution, then with water and dried with solid potassium carbonate. To the filtered solution is added gradually and with shaking a solution of oxalic acid in ether until the mixture reacts slightly acid. The precipitated 4-dimethylamino-1-(1-acetylindol-3-yl)-1-phenylbut-1-ene oxalate is filtered off, washed with ether and dried. Yield 80%. Melting point 181.5–183° after crystallisation from ethanol or from a mixture of ethanol and ether.

Analysis.—Calcd. for $C_{24}H_{26}O_5N_2$: C, 68.24%; H, 6.21%; N, 6.65%. Found: C, 68.5%; H, 6.1%; N, 6.9%.

EXAMPLE 2

4-dimethylamino-1-(indol-3-yl)-1phenylbut-1-ene maleinate

A solution of 4.6 g. of 4-dimethylamino-1-(indol-3-yl)-1-phenylbutan-1-ol in 50 ml. of anhydrous benzene, to which is added 5 g. of polyphosphoric acid ethyl ester (with a ratio $P_2O_5$:ethanol of 2:5) is refluxed for two hours with stirring. The mixture is cooled, then poured into ice-water and made alkaline by addition of sodium hydroxide. The aqueous layer is separated and extracted with ether. The combined benzene and ether solution is washed with water and dried with solid potassium carbonate. From the filtrate, the solvents are removed by distillation and the residue is dissolved in about 100 ml. of ether. A solution of maleic acid in ether is added gradually until the mixture reacts very slightly acid. The precipitated 4-dimethylamino-1-(indol-3-yl)-1-phenylbut-1-ene maleinate is filtered off, washed with ether and crystallised from ethanol or from a mixture of ethanol and ether. Yield 50%. Melting point 177–177.5°.

*Analysis*—Calcd. for $C_{24}H_{26}O_4N_2$: C, 70.91%; H, 6.45%; N, 6.89%. Found: C, 71.0%; H, 6.4%; N, 7.0%.

EXAMPLE 3

*4-dimethylamino-1-(1-methylindol-3-yl)-1-phenylbut-1-ene oxalate*

To 1 g. of magnesium in 5 ml. of anhydrous tetrahydrofuran is added a drop of methyliodide. When the reaction has subsided, about 2 ml. of a solution of 5 g. of freshly distilled γ-dimethylaminopropyl chloride in 15 ml. of tetrahydrofuran are added. The reaction usually starts immediately and gradually the remainder of the γ-dimethylaminopropyl chloride solution is added at such a rate that the mixture keeps refluxing. Stirring is unnecessary during addition. After the addition is completed, the reaction mixture is stirred for 20 minutes. Then a further amount of 15 ml. of tetrahydrofuran is added, followed by 6.1 g. of 1-methylindol-3-yl phenyl ketone. The ketone is added in small portions at room temperature. The mixture is stirred vigorously during the addition. The mixture is boiled under reflux for six hours. It is then cooled and the magnesium complex decomposed by the addition of a 15% ammonium chloride solution. The tetrahydrofuran layer is separated and the water layer extracted with ether. The combined tetrahydrofuran and ether solutions are washed with water, then with a saturated sodium chloride solution and dried with sodium sulphate. After filtration the solvents are distilled off. To the cooled residue about 100 ml. of ether are added followed by gradual addition of a solution of oxalic acid in ether until the mixture reacts slightly acid. The precipitated 4-dimethylamino-1-(methylindol-3-yl)-1-phenylbut-1-ene oxalate is filtered off, washed with ether and crystallised from ethanol or from a mixture of ethanol and ether. Yield: 74%. Melting point 157–158°.

*Analysis.*—Calcd. for $C_{23}H_{26}O_4N_2$: C, 70.03%; H, 6.64%; N, 7.10%. Found: C, 70.0%; H, 6.6%; N, 7.0%.

EXAMPLE 4

*4-dimethylamino-1-(1-methylindol-3-yl)-1-(m-tolyl)but-1-ene oxalate*

Following the procedure described in Example 3 but substituting an equivalent amount of 1-methylindol-3-yl m-tolyl ketone for the 1-methylindol-3-yl phenyl ketone, 4-dimethylamino-1-(1-methyl-indol-3-yl)-1-(m-tolyl)but-1-ene oxalate is prepared. Yield 84%; melting point 163.5–164°.

*Analysis.*—Calcd. for $C_{24}H_{18}O_4N_2$: C, 70.55%; H, 6.91%; N, 6.86. Found: C, 70.4%; H, 6.9; N, 6.8%.

EXAMPLE 5

*4-dimethylamino-1-(1-methylindol-3-yl)-1-(p-tolyl)but-1-ene oxalate*

Following the procedure described in Example 3 but substituting an equivalent amount of 1-methylindol-3-yl p-tolyl ketone for the 1-methylindol-3-yl phenyl ketone, 4-dimethylamino-1-(1-methylindol-3-yl)-1-(p-tolyl)but-1-ene oxalate is prepared. Yield 65%. Melting point 177.5–178.5°.

*Analysis.*—Calcd. for $C_{24}H_{28}O_4N_2$: C, 70.55%; H, 6.91%; N, 6.86%. Found: C, 70.6%; H, 7.0%; N, 7.0%.

Similarly, by following the procedure of Example 2 but substituting the indicated 4-dimethylamino-1-(indol-3-yl)-1-(Z-substituted phenyl)butan-1-ol for the 4-dimethylamino-1-(indol-3-yl)-1-phenylbutan-1-ol, the indicated 4-dimethylamino-1-(indol-3-yl)-1-(Z-substituted phenyl)but-1-ene is formed:

| Example | Z-substituted Reactant | Z-substituted Product |
|---|---|---|
| 6 | p-Chloro | p-Chloro. |
| 7 | o-Bromo | o-Bromo. |
| 8 | p-Trifluoromethyl | p-Trifluoromethyl. |
| 9 | p-Ethyl | p-Ethyl. |
| 10 | m-Ethoxy | m-Ethoxy. |

Moreover, by following the procedure of Example 2, but substituting the indicated 4-dimethylamino-1-(Z-substituted-indol-3-yl)-1-phenylbutan-1-ol for the 4-dimethylamino-1-(indol-3-yl)-1-phenylbutan-1-ol, the indicated 4-dimethylamino-1-(Z-substituted-indol-3-yl)-1-phenyl-but-1-ene is formed:

| Example | Z-substituted Reactant | Z-substituted Product |
|---|---|---|
| 11 | 1-Benzyl | 1-Benzyl. |
| 12 | 1,2-Dimethyl | 1,2-Dimethyl. |
| 13 | 1-Methyl-2-ethyl | 1-Methyl-2-ethyl. |
| 14 | 1-Methyl-6-chloro | 1-Methyl-6-chloro. |
| 15 | 5-Bromo | 5-Bromo. |
| 16 | 1-Methyl-5-methoxy | 1-Methyl-5-methoxy. |
| 17 | 6-Ethoxy | 6-Ethoxy. |
| 18 | 1,2-Dimethyl-7-ethoxy | 1,2-Dimethyl-7-ethoxy. |

Similarly, by substituting the indicated Z′-1-(indol-3-yl)-1-phenyl-alkan-1-ol for the 4-dimethylamino-1-(indol-3-yl)-1-phenyl-butan-1-ol in the procedure of Example 1, the indicated Z′-1-(indol-3-yl)-1-phenyl-alk-1-ene is formed:

| Example | Reactant | | Product | |
|---|---|---|---|---|
| | Z′ is— | Alkan-1-ol is— | Z′ is— | alk-1-ene is— |
| 19 | 5-Diethylamino | Pentan-1-ol | 5-Diethylamino | Pent-1-ene. |
| 20 | 4-Piperidino | Butan-1-ol | 4-Piperidino | But-1-ene. |
| 21 | 4-Piperazino | Butan-1-ol | 4-Piperazino | But-1-ene. |
| 22 | 4-Morpholino | Butan-1-ol | 4-Morpholino | But-1-ene. |
| 23 | 6-Dimethylamino | Hexan-1-ol | 6-Dimethylamino | Hex-1-ene. |

The invention includes within its scope pharmaceutical preparations containing one or more of the therapeutically active compounds of Formula I, or non-toxic acid addition salts thereof, in association with a pharmacologically acceptable carrier. The preparation may take any of the forms customarily employed for administration of therapeutically active substances, but the preferred types are those suitable for oral administration and especially tablets, pills, and capsules, including the substance. The tablets and pills may be formulated in manner known per se with one or more pharmacologically acceptable diluents or excipients, such as lactose or starch, and include materials of a lubricating nature such as calcium stearate. Capsules made of absorbable material, such as gelatine, may contain the active substance alone or in admixture with a solid or liquid diluent. Liquid preparations may be in the form of suspensions, emulsions, syrups or elixirs of the active substance in water or other liquid medium commonly used for making orally acceptable pharmaceutical formulations, such as liquid paraffin, or a syrup or elixir base. The active substance may also be made up in a form suitable for parenteral administration, i.e., as a suspension or emulsion in sterile water or an organic liquid usually employed for injectable preparations, for example vegetable oil, such as olive oil, or a sterile solution in an organic solvent.

The invention may be variously otherwise embodied within the scope of the appended claims.

What is claimed is:

1. A compound selected from the group consisting of bases of the formula

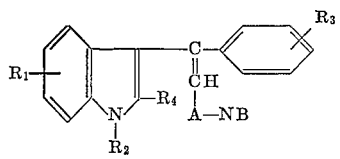

and non-toxic acid-addition salts thereof, wherein $R_1$ is selected from the group consisting of hydrogen, halogen and lower alkoxy, $R_2$ is selected from the group consisting of hydrogen, lower alkyl, phenyl (lower alkyl) and lower alkanoyl, $R_3$ is selected from the group consisting of hydrogen, halogen, trifluoromethyl, lower alkyl and lower alkoxy, $R_4$ is selected from the group consisting of hydrogen and lower alkyl, A is lower alkylene, and NB is a basic nitrogen-containing radical selected from the group consisting of amino, di(lower alkyl)amino, piperidino, morpholino, piperazino, N-(lower alkyl)piperazino and pyrrolidino.

2. Di(lower alkyl)amino-1-(indol-3-yl)-1-phenyl(lower alk-1-ene).

3. 4-dimethylamino-1-(indol-3-yl)-1-phenylbut-1-ene.

4. A non-toxic acid-addition salt of the compound of claim 2.

5. Di(lower alkyl)amino-1-[1-(lower alkanoyl)indol-3-yl]-1-phenyl(lower alk-1-ene).

6. 4 - dimethylamino - 1 - (1-acetylindol-3-yl)-1-phenyl-but-1-ene.

7. Di(lower alkyl)amino-1-[1-(lower alkyl)indol-3-yl]-1-phenyl(lower alk-1-ene).

8. 4 - dimethylamino-1-(1-methylindol-3-yl)-1-phenyl-but-1-ene.

9. Di(lower alkyl)amino-1-[1-(lower alkyl)indol-3-yl]-1-(lower alkyl)phenyl-(lower alk-1-ene).

10. 4 - dimethylamino - 1-(1-methylindol-3-yl)-1-tolyl-but-1-ene.

No references cited.

NICHOLAS S. RIZZO, *Primary Examiner.*